US010064519B2

(12) United States Patent
Paille et al.

(10) Patent No.: US 10,064,519 B2
(45) Date of Patent: Sep. 4, 2018

(54) SPIKE-STYLE TOASTING DEVICE

(71) Applicant: Hula Dog Franchise, Inc., Honolulu, HI (US)

(72) Inventors: Lawrence Paille, Kapaa, HI (US); Dominique Quinette, Honolulu, HI (US); Scott March, Kailua-Kona, HI (US)

(73) Assignee: Hula Dog Franchise, Inc., Honolulu, HI (US)

( * ) Notice: Subject to any disclaimer, the term of this patent is extended or adjusted under 35 U.S.C. 154(b) by 205 days.

(21) Appl. No.: 14/883,591

(22) Filed: Oct. 14, 2015

(65) Prior Publication Data

US 2016/0150912 A1 Jun. 2, 2016

Related U.S. Application Data

(60) Provisional application No. 62/123,938, filed on Dec. 2, 2014.

(51) Int. Cl.
*A47J 27/62* (2006.01)
*A47J 37/08* (2006.01)

(52) U.S. Cl.
CPC ................. *A47J 37/0864* (2013.01)

(58) Field of Classification Search
CPC ..... A47J 37/0864; A47J 37/08; B23K 31/025; A23V 2002/00; A23V 2200/126; A23V 2250/5422; A21C 15/00; A23P 20/25; A23L 33/18; A23L 33/20; F24C 7/06; F24C 7/087

USPC ...... 99/331, 421 V, 419, 451, 385, 426, 447, 99/448, 428, 444, 445, 446, 449, 425, 99/441, 483, 339, 342; 219/478, 521, 219/523, 534, 535, 536, 539, 552, 542, 219/530, 354, 214, 242, 385, 446, 448, 219/477, 453, 462
See application file for complete search history.

(56) References Cited

U.S. PATENT DOCUMENTS

| | | | |
|---|---|---|---|
| D33,415 S | 10/1900 | Bedle | |
| 1,339,625 A | 5/1920 | Holloway | |
| 1,802,532 A | 4/1931 | Pulver | |
| 1,848,030 A | 3/1932 | Sibley | |
| 1,902,564 A | 3/1933 | Mabey | |
| 2,111,456 A | 3/1938 | Markle, Jr. | |
| 2,648,275 A | 8/1953 | Thompson | |
| 3,324,618 A * | 6/1967 | Blickle | B61D 19/004 52/127.12 |
| 3,356,401 A * | 12/1967 | Bertram | F16B 33/004 411/259 |
| 3,377,943 A * | 4/1968 | Martin | A21C 15/00 219/242 |
| 3,392,866 A * | 7/1968 | Alleaume | F17C 3/027 220/560.05 |

(Continued)

*Primary Examiner* — Tu B Hoang
*Assistant Examiner* — Masahiko Muranami
(74) *Attorney, Agent, or Firm* — Culpepper IP, LLLC; Kerry S. Culpepper

(57) ABSTRACT

A toasting device includes a housing, a heating spike extending outwardly from an upper surface of the housing, and an insulating spacer connected to a base portion of the heating spike and to the upper surface of the housing by first attachment members. The insulating spacer is composed of a highly heat resistive material to substantially insulate the housing from heat associated with the heating spike.

8 Claims, 14 Drawing Sheets

(56) References Cited

U.S. PATENT DOCUMENTS

| | | | |
|---|---|---|---|
| 3,635,146 A | 1/1972 | Jean-Pierre | |
| 3,665,155 A * | 5/1972 | Caroleo | H05B 3/44 219/523 |
| 3,965,808 A | 6/1976 | Chomette | |
| 4,192,992 A * | 3/1980 | Stevens | H05B 3/78 219/437 |
| D257,886 S | 1/1981 | Kersten | |
| 4,272,669 A | 6/1981 | Yamanaka | |
| 4,346,287 A * | 8/1982 | Desloge | H05B 3/06 219/541 |
| D268,698 S | 4/1983 | Knute | |
| D310,722 S | 9/1990 | Broden | |
| 5,006,690 A * | 4/1991 | Cole | A47J 37/08 219/385 |
| 5,207,573 A * | 5/1993 | Miyagi | C21D 1/34 432/152 |
| D365,630 S | 12/1995 | Sullivan | |
| 5,528,722 A * | 6/1996 | Adkins | H05B 3/78 219/523 |
| D401,871 S | 12/1998 | Edwards | |
| D403,398 S | 12/1998 | Guala | |
| D408,230 S | 4/1999 | Evans | |
| D495,932 S | 9/2004 | Kopka | |
| 7,004,064 B1 | 2/2006 | Turner | |
| D564,712 S | 3/2008 | Cole | |
| 7,339,136 B2 | 3/2008 | Schmanski | |
| 7,440,283 B1 * | 10/2008 | Rafie | E21B 47/011 165/185 |
| D593,315 S | 6/2009 | Zemel | |
| D623,846 S | 9/2010 | Kahng | |
| D668,920 S | 10/2012 | Sandoval | |
| D721,254 S | 1/2015 | Cyphers | |
| D742,187 S | 11/2015 | Thompson | |
| D749,361 S | 2/2016 | Goodyear, Jr. | |
| D753,967 S | 4/2016 | London | |
| 2016/0174768 A1 | 6/2016 | DeVerse | |

\* cited by examiner

SPIKE-STYLE TOASTING DEVICE

CROSS-REFERENCE TO RELATED APPLICATIONS

The present application claims the benefit of Provisional Application No. 62/123,938 filed on Dec. 2, 2014.

TECHNICAL FIELD

The technical field relates generally to devices for cooking food items and, more particularly, to a spike-style toasting device for such cooking

BACKGROUND

A conventional spike-style toasting device includes heating spikes disposed on a housing, wherein each of the heating spikes includes a heating element. In operation, a food item such as, for example, bread for a hot dog or sausage, is placed on a heating spike to form a cavity in the food item. Heat generated from the heating element in the heating spike heats the heating spike, which thereby toasts the interior of the food item.

Examples of toasting devices include the "Sandwich Tool" described in U.S. Pat. No. 1,848,030 to Sibley, the "Bun Puncher and Toaster" described in U.S. Pat. No. 1,902,564 to Mabey, the "Bun Toaster" described in U.S. Pat. No. 2,648,275 to Thompson, the "Device for Toasting the Interior of Buns" described in U.S. Pat. No. 3,377,943 to Frank, the "Heating Apparatus for Bread and Filler Material" described in U.S. Pat. No. 3,635,146 to Jean-Pierre, the "Internal Bun Toaster" described in U.S. Pat. No. 3,965,808 to Chomette, and the "Bread Impaling Cooking Utensil" described in U.S. Pat. No. 7,339,136 to Schmanski, among others, the contents all of which are incorporated herein by reference.

SUMMARY

Underwriters Laboratories (UL) is a safety consulting and certification company that provides safety-related certification, validation, testing, inspection, as well as other services to manufacturers, retailers, etc. NSF international is a global independent public health and environmental organization that provides product standards, product certification, as well as other services. UL and NSF standards are currently accepted in all fifty states. Moreover, some government agencies require that UL and/or NSF standards be satisfied for commercial cooking equipment. Therefore, it is preferably that a toasting device satisfies UL and/or NSF standards.

It is desirable that the temperature of the heating spikes of the toasting device be raised to a high temperature such as, for example, 475 degrees Fahrenheit in a short amount of time in order to shorten the time required to toast the food item. On the other hand, it is also desirable to stop or substantially limit heat transfer from the heating spikes to the housing of the toasting device because such heat transfer can shorten the operational life of the device components and presents an unsafe operating condition.

An approach to limiting heat transfer is to include ventilation holes in the base of the housing as described in U.S. Pat. No. 3,635,146 to Jean-Pierre. However, this approach is not acceptable under existing commercial sanitary standards because the holes can give vermin access to the interior of the device.

Another approach to limit heat transfer is to place the heating spikes on top of elevated rectangular rails which include holes for dissipating heat before it is transferred to the housing. However, the rails could create inaccessible areas that would be very difficult to clean. Such a toasting device may not satisfy certain NSF standards and thereby not be accepted by UL.

The "Internal Bun Toaster" described in U.S. Pat. No. 3,965,808 to Chomette includes heating spikes coated with polytetrafluoroethylene (PTFE) and smooth surfaces for ease of cleaning However, this toasting device does not stop or substantially limit heat transfer from the heating spikes to the housing of the toasting device because the heating element is at least partially contained within the housing. Moreover, this configuration must limit the number of heating spikes used and the temperature of the heating spikes, thereby resulting in slower and less complete toasting of the bun.

In view of the above problems, as well as other concerns, a spike-style toasting device for heating a plurality of food items according to the present disclosure includes a housing, a plurality of heating spikes and a plurality of insulating spacers connected to base portions of the plurality of heating spikes, respectively. Each of the heating spikes includes an internal heating element, can be made of aluminum, and includes a pointed portion extending outwardly from an upper surface of the housing for creating a cavity in a respective one of the plurality of food items. The internal heating element can be disposed within an upper half of the respective heating spike to provide an unheated lower portion of the respective heating spike.

Each of the plurality of insulating spacers can be connected to the respective heating spike and an upper surface of the housing by first attachment members to thereby prevent direct contact between the plurality of heating spikes and the housing. The upper surface of the housing, the plurality of insulating spacers, and the plurality of heating spikes define a food zone which contacts the plurality of food items. Each of the plurality of insulating spacers is composed of a highly heat resistive material such as PTFE to substantially insulate the housing from heat generated from the respective heating spike.

The housing can include an aluminum bottom plate and a stainless steel chassis. Rather than including ventilation holes, the outer surfaces of the housing can be impermeable to prevent contamination of an interior of the housing.

According to an embodiment, the first attachment members include a material having low heat conductivity such as PTFE to substantially limit heat transfer from the plurality of heating spikes to the housing. Each of the first attachment members include a head portion disposed in the housing, an extending portion extending through the insulating spacer and an engaging portion engaging with a receiving portion of the respective heating spike.

According to another embodiment, the first attachment members include: a primary attachment member including a head portion disposed in the housing and an engaging portion engaging with a receiving portion of the respective insulating spacer; and a secondary attachment member including a head portion disposed in the respective insulating spacer and an engaging portion engaging with a receiving portion of the respective heat spike, wherein the primary and secondary attachment members are separated from each other to prevent a heat path between the housing and the respective heat spike. The first attachment members according to this embodiment can also include a material having low heat conductivity.

In both embodiments, the first attachment members can be threaded screws and the receiving portions can be interior threaded portions of through-holes.

The toasting device can further include one or more thermal cutoff devices configured to shut off one or more internal heating elements when a temperature associated with the toasting device generally and/or one or more of the plurality of heating spikes is greater than a predetermined limit. The thermal cutoff device can be mounted on a mounting bracket which is secured to an internal surface portion of the housing under one or more of the plurality of heating spikes by second attachment members. The second attachment members can be second primary attachment members including a head portion disposed in the housing and an engaging portion engaging with receiving portions of the respective insulating spacer.

A controller electrically coupled to the plurality of heating spikes is configured to control electrical power to the plurality of heating spikes to thereby control temperature of the toasting device. At least one of the plurality of heating spikes includes a thermocouple electrically coupled to the controller for measuring the temperature.

During operation, food items can be placed on the plurality of heating spikes of the toasting device to form the cavity having an opening at only one end in each of the food items. The controller is manipulated by the user prior to or after placing the food items to provide power and thereby heat to the heating spikes. The food items are heated to a predetermined temperature to thereby toast an interior surface of the cavities.

BRIEF DESCRIPTION OF THE DRAWINGS

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.opie

DETAILED DESCRIPTION

In overview, the present disclosure concerns a toasting device for food items such as bread for a hot dog or sausage referred to as a "bun". In the various embodiment discussed in the disclosure the term "bun" will be used here to refer to all types of bread. However, it should be noted that the toasting device is not limited to a bun, but can also be used to toast other food items. Further, toasting here can refer to, for example, browning, cooking, or generally heating the bun particularly or food item generally by exposure to heat.

The instant disclosure is provided to further explain in an enabling fashion the best modes of performing one or more embodiments of the toasting device. The use of relational terms such as first and second, top and bottom, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Figure 1:
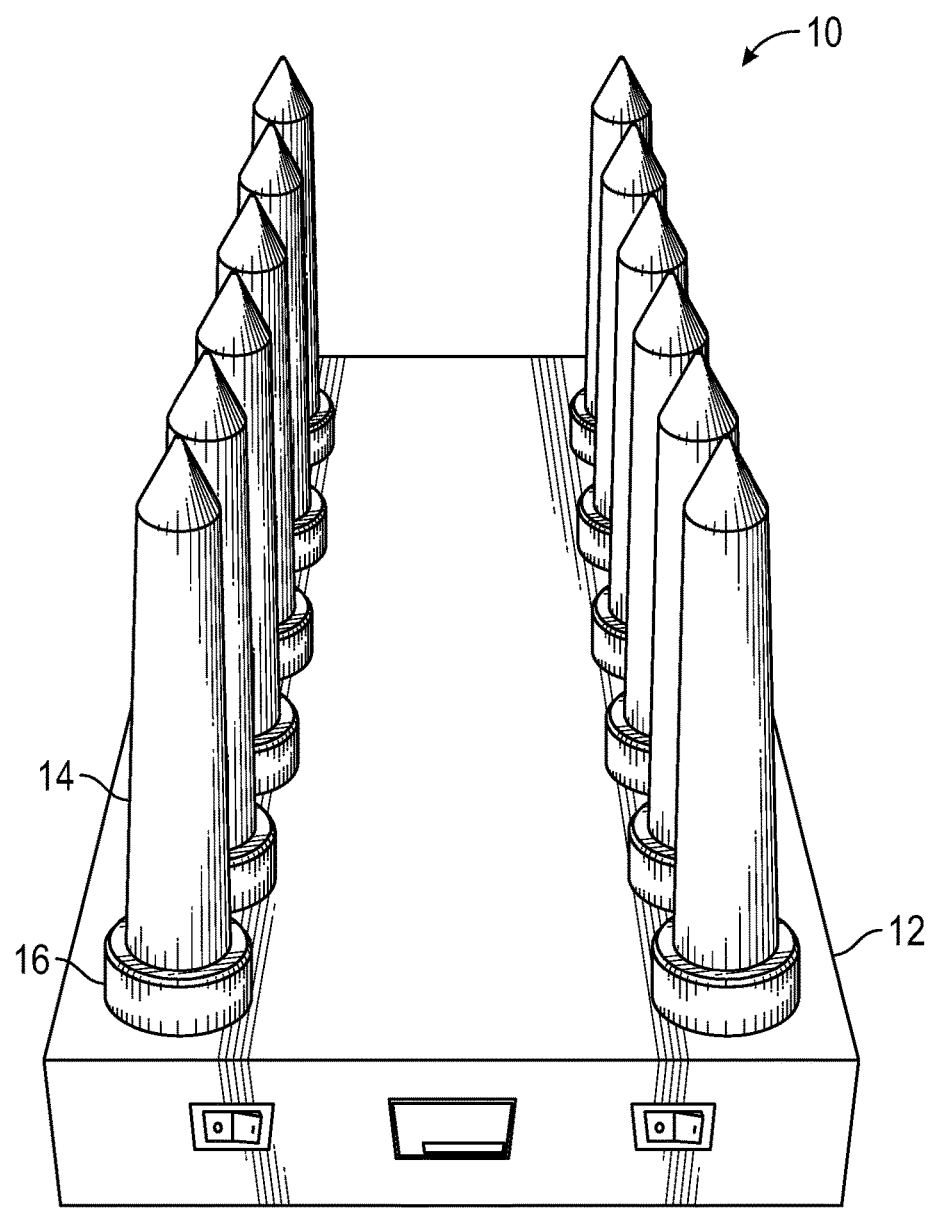
FIG. 1 is a perspective view of the toasting device according to an exemplary embodiment.

Referring to FIG. 1, the toasting device 10 includes a housing 12, a plurality of heating spikes 14 and a plurality of insulating spacers 16. In this exemplary configuration, the toasting device 10 includes twelve heating spikes 14 arranged in two rows of six. However, the toasting device 10 is not limited to this arrangement. Particularly, other arrangements of the heating spikes 14 such as in a circle, square, grid or other geometrical figures are possible. The upper surface of the housing 12, the plurality of insulating spacers 16, and the plurality of heating spikes 14 define a food zone which can contact food items to be toasted.

Referring to FIGS. 3A-3D, the housing 12 can include an upper plate 122, four side plates 124 and a bottom plate 126. The upper and side plates 122, 124 can be a metal chassis composed of any commercially certified metal such as, for example, #16 stainless steel 4B T-304. The upper plate 122 can have a width of approximately 11 inches and a length of 24 inches. The side plates 122, 124 can have a height of approximately 2.6875 inches. The bottom plate 126 can be, for example, a 0.063 inch thick aluminum 3003 plate. Generally, the upper plate 122 of the housing 12 is preferably made of food-grade metal. Commercial standards require the surfaces of the housing 12 to be smooth and accessible so that they can be easily cleaned. Moreover, it is best to not include openings in the toasting device 10 which can admit vermin or create other safety issues. However, ventilation holes may be necessary in order to prevent the toasting device 10 from overheating. Therefore, a screen or louver (not shown) can be placed over any ventilation holes to prevent interior contamination. However, because of the novel features associated with the heating spikes 14 and insulating spacers 16 discussed below, the outer surfaces of the housing 12 can preferably be impermeable (no ventilation holes) while maintaining a low internal temperature.

Figure 2:
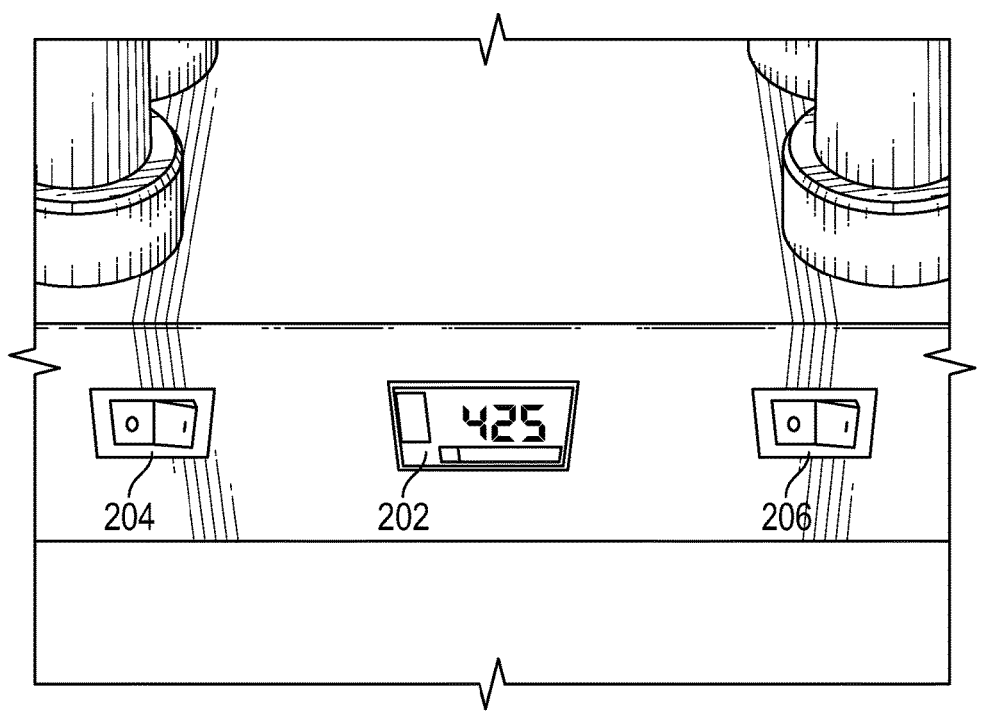
FIG. 2 is a section view of the control panel of the toasting device shown in FIG. 1.
Figure 3A:
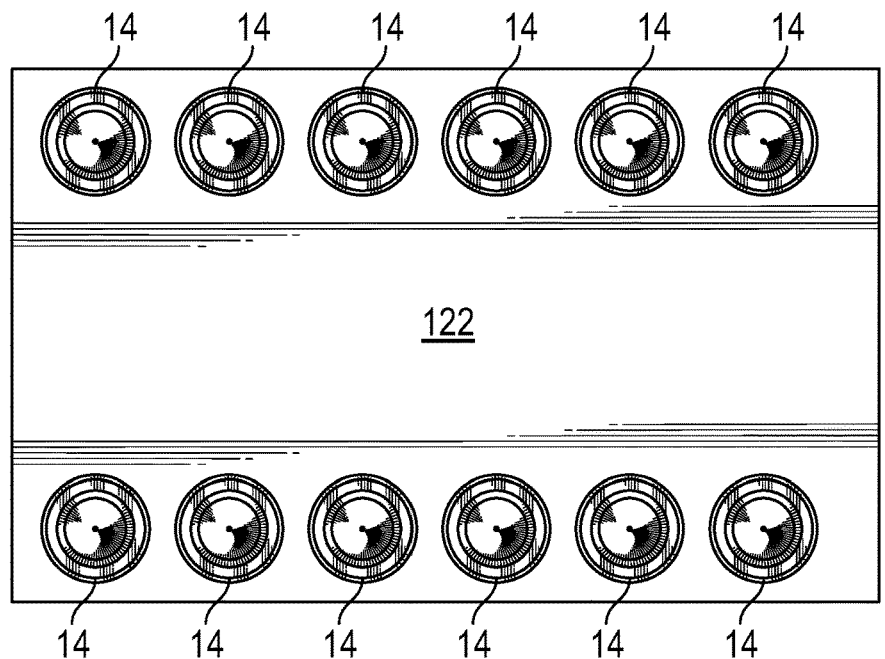
FIG. 3A is a top view of the toasting device.
Figure 3B:
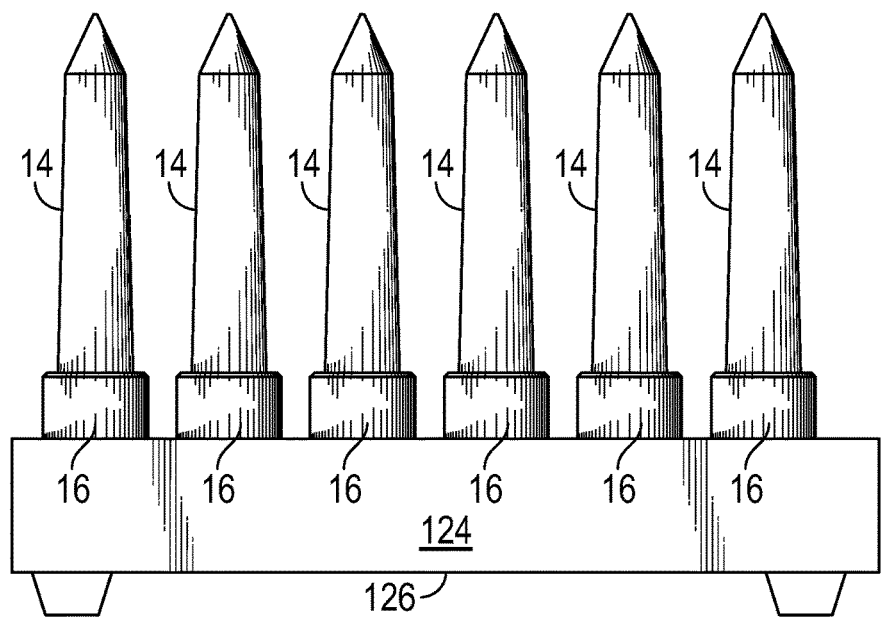
FIG. 3B is a side view of the toasting device.
Figure 3C:
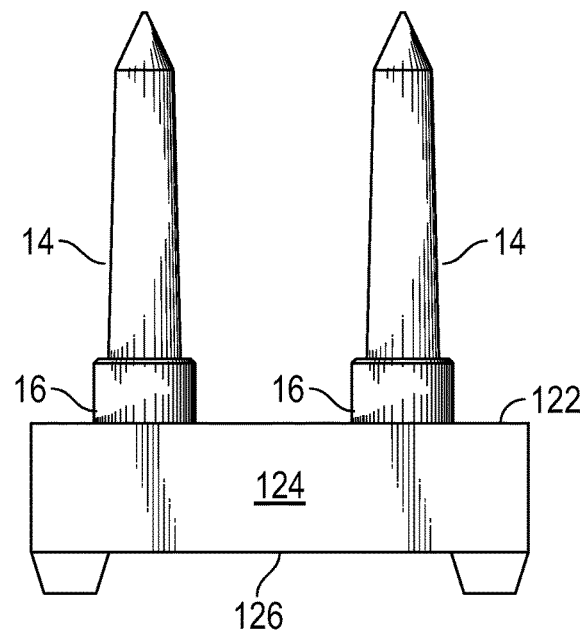
FIG. 3C is a rear view of the toasting device.
Figure 3D:
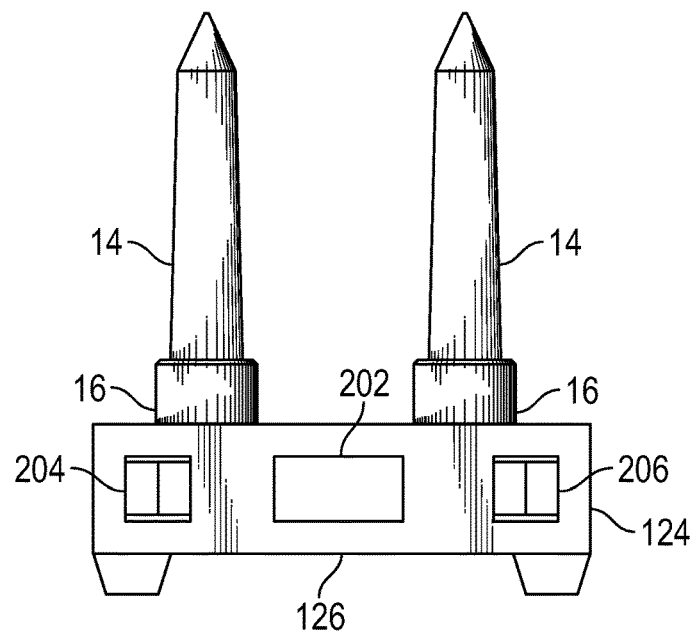
FIG. 3D is a front view of the toasting device.

Referring to FIG. 2, the housing 12 includes a digital temperature control panel 202 and first and second switches 204, 206 on one of the side plates 124. The first and second switches 204, 206 can switch power on and off to the first and second rows of the heat spikes 14, respectively. The panel 202 can be the user interface for a digital controller (see FIG. 7) which is electrically coupled to the plurality of heating spikes 14 by, for example oven-grade wiring. Particularly, the control panel 202 can include a digital display for displaying a temperature associated with the toasting device 10 and buttons for adjusting the temperature. The digital controller can obtain the temperature to be displayed from a thermocouple included in one of the heating spikes 14. The digital controller can control the temperature of one or more of the spikes 14 by sending a control signal to adjust the electrical power (current or voltage) to the respective heating spikes.

Figure 4A:
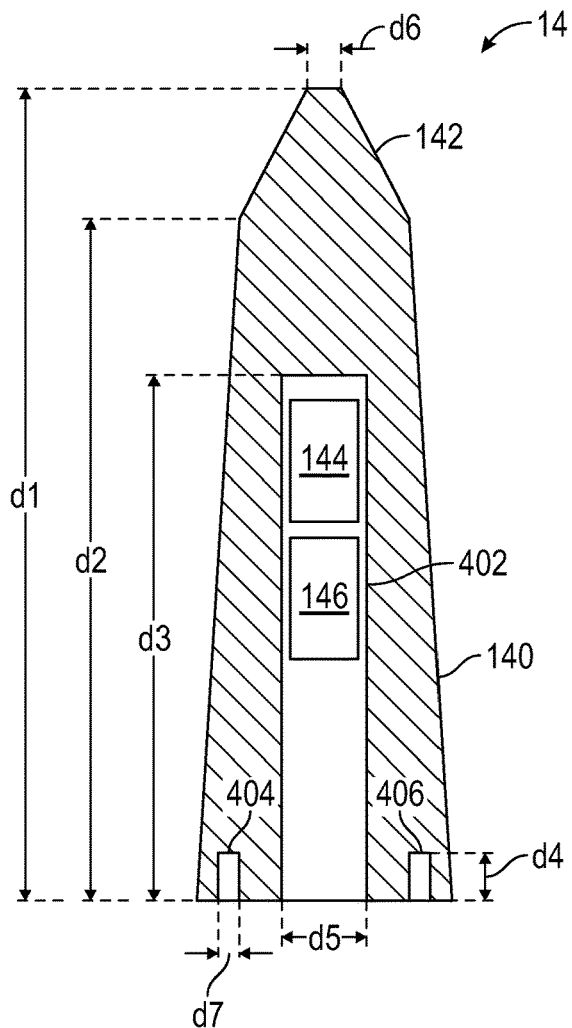
FIG. 4A is a cross-sectional view of a heating spike according to an exemplary embodiment.
Figure 4B:
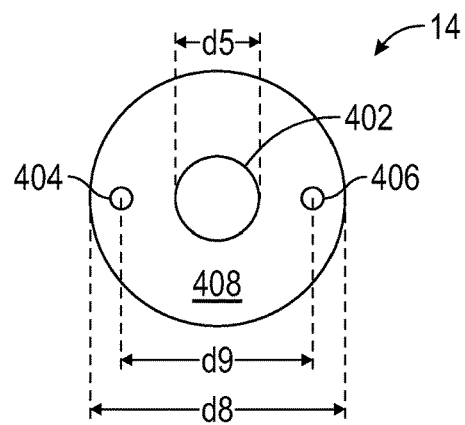
FIG. 4B is a view of a base portion of the heating spike shown in FIG. 4A.

Referring to FIGS. 4A-4B, the plurality of heating spikes 14 will be discussed. Each of the heating spikes 14 extends outwardly from the upper surface on the upper plate 122 of the housing 12 and includes a tapered portion 140 and a pointed portion 142. When a bun is placed on the pointed portion 142, the pointed portion 142 can create a cavity in the bun. Generally, a height d1 of the spikes 14 is not limited, but can be decided based upon the typical food item to be toasted. In one exemplary configuration, the height d1 of each of the spikes 14 is 6 inches and a height d2 of the tapered portions 140 of the spikes 14 is 5 inches. Further, a width d6 of a top of the pointed portion 142 may be, for example, 0.125 inches. A base portion 408 of the spike 14 can be circular shaped with a diameter d8 of, for example, 1.25 inches.

Each of the heating spikes 14 includes an internal chamber 402 for storing an internal heating element 144. At least one of the heating spikes 14 further includes a thermocouple 146 in the chamber 402 for temperature measuring. Although not shown here, an oven-grade wire extending in the chamber 402 connects the heating element 144 and the thermocouple 146 to the electrical portion in housing 12. The chamber 402 can have a diameter or width d5 of, for example, 0.375 inches. Generally, the shape and height of the internal chamber 402 are not limited. However, the chamber 402 should preferably have a height d3 sufficient for positioning the internal heating element 144 far enough away from the housing 12 to prevent or substantially limit heat transfer from the heating spike 14 to the housing 12. Particularly, a height d3 of the internal chamber 402 can be greater than 50 percent of the height d2 of the tapered portion and/or 40 percent of the height d1 of the spike 14. For example, in one exemplary configuration, the height d3 of the internal chamber is 2.625 inches. More preferably, the internal heating chamber 402 can have a height d3 sufficient for positioning the internal heating element 144 in an upper half of the heating spike 14 and more near the pointed portion 142 so that an unheated lower portion below the internal hearing element remains cool. This unheated lower portion will be referred to here as a cold zone. The cold zone will be between the heated portion of the heating spike 14 and the housing 10. For example, in one exemplary configuration, the height d3 of the internal chamber is 4.125 inches.

A base portion 408 of the heating spike 14 includes two receiving portions 404, 406 for receiving engaging portions of attachment members to connect the heating spike 14 and the insulating spacer 16. Generally, the height d4 and width d7 of the receiving portions 404, 406 are not limited. However, in one exemplary configuration, the receiving portions 404, 406 are blind threaded holes configured with 10-32 interior threads. A distance d9 between centers of the receiving portions can be, for example, 0.9375 inches.

Each of the heating spikes 14 can be made from a food-grade metal such as, for example, aluminum. Particularly, an aluminum rod can be machined on its outer surface to form the tapered and pointed portions 140, 142. The chamber 402 and receiving portions 404, 406 can be formed by drilling the aluminum rod.

Returning to FIG. 3B, the plurality of insulating spacers 16 are connected to the base portions of the plurality of heating spikes 14, respectively and to the upper surface of the housing 12 on the upper plate 122 to be external to the housing 12. The insulating spacers 16 are composed of a highly heat resistive material to substantially insulate the housing 12 from heat associated with the heating spike 14. Because the insulating spacers 16 are in the food zone and external to the housing 12, the insulating spacers 16 are made from a food-grade material complying with federal standards and with NSF-51 (Food Equipment Materials). For example, the insulating spacers 16 can be made of virgin polytetrafluoroethylene (PTFE), ceramics, glass, porcelain, enamel, lava and other high-temperature plastics.

Figure 5A:
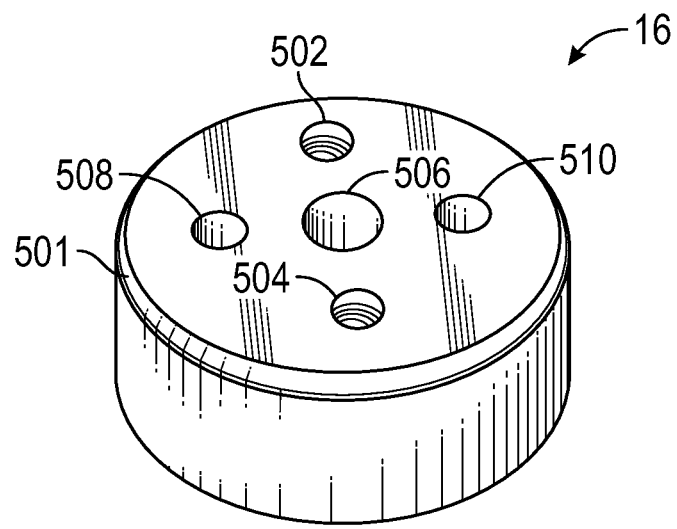
FIGS. 5A-5B are perspective views of an insulating spacer of the toasting device according to an exemplary embodiment.
Figure 5B:
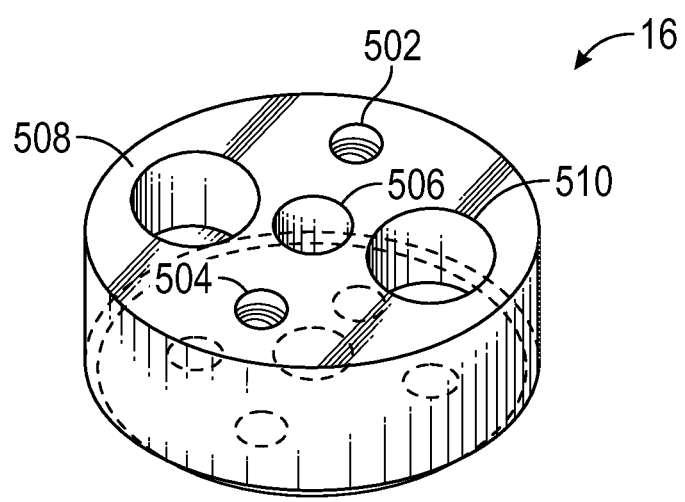
Figure 5C:
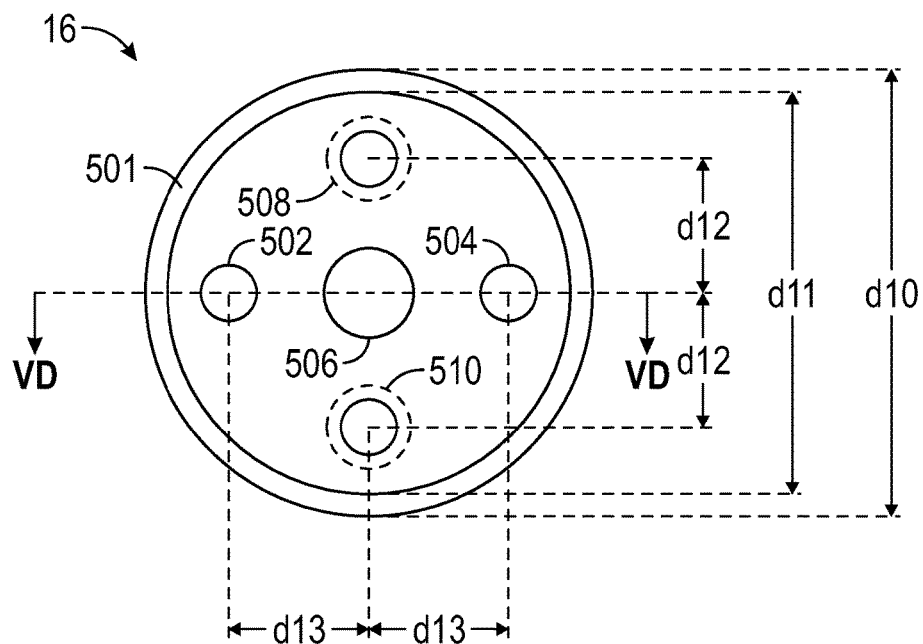
FIG. 5C is a top view of the insulating spacer.
Figure 5D:
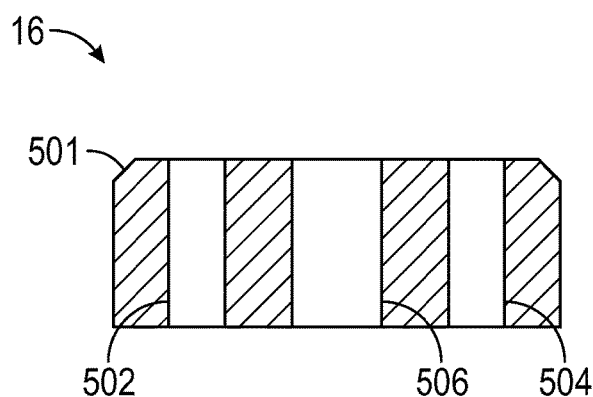
FIG. 5D is a cross-sectional view of the insulating spacer along line VD-VD of FIG. 5C.

Referring to FIGS. 5A-5B, each of the plurality of insulating spacers 16 can include a tapered portion 501, a plurality of first through-holes 502, 504, a center through-hole 506 and a plurality of second through-holes 508, 510. The tapered portion 501 can blend the side surface to the top surface in order to create a smoother, less sharp transition. The tapered portion 501 can be tapered at an angle of, for example, 45 degrees. Referring to FIGS. 5C-5D, the plurality of first through-holes 502, 504 can include a receiving portion to engage with an engaging portion of attachment members to connect the insulating spacer 16 to the housing 12. For example, the receiving portion can be a threaded interior portion of the through-holes 502, 504 which engages with the threads of screws (as the attachment members) such as 10-32 screws.

The center through-hole 506 provides a passage for feeding a wire connecting the heating element 144 and/or thermocouple 146 to the electrical portion in housing 12. The center through-hole can have a diameter of, for example, 0.375 inches.

In one exemplary configuration, an outer diameter d10 of the insulating spacer 16 can be 1.75 inches and an inner diameter d11 can be 1.60 inches. A distance d12 from the center of the insulating spacer 16 to the center of each of the second through-holes 508, 510 and a distance d13 from the center of the insulating spacer 16 to the center of each of the first through-holes 502, 504 can be 0.469 inches.

Figure 5E:
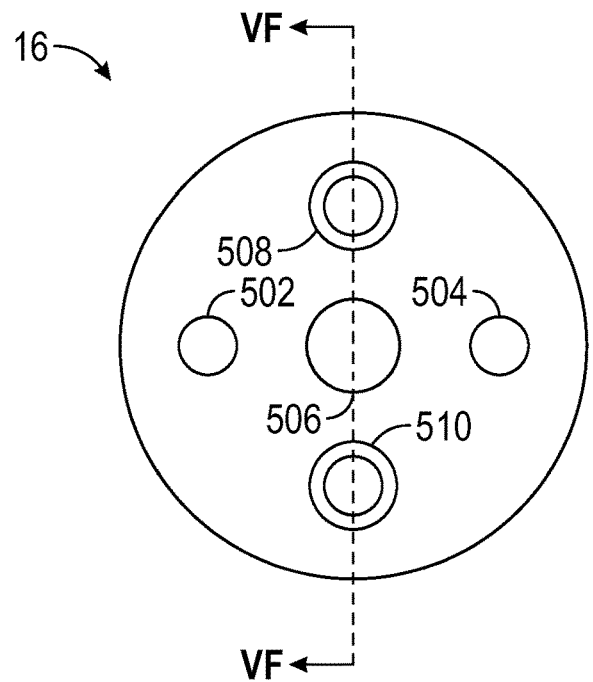
FIG. 5E is a bottom view of the insulating member.
Figure 5F:
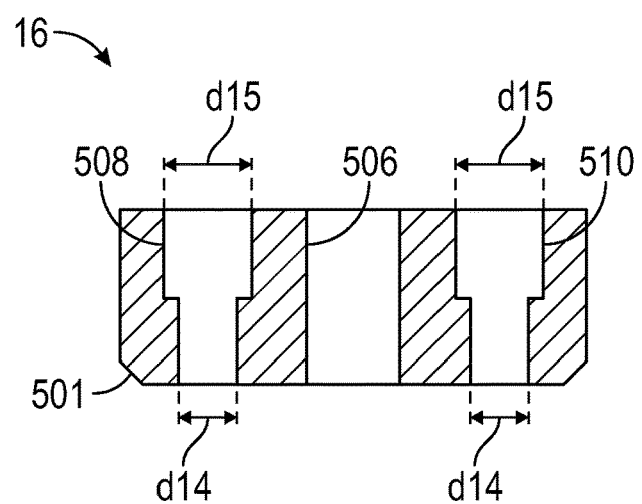
FIG. 5F is a cross-sectional view of the insulating spacer along line VF-VF of FIG. 5C.

Referring to FIGS. 5E-5F, the plurality of second through-holes 508, 510 can include a larger diameter portion for providing clearance for, for example, a screw head and a narrower diameter portion for providing clearance for the screws. The diameter d14 of the narrower diameter portion can be substantially equal to the width d7 of the receiving portions 404, 406. The diameter d14 can be, for example, 0.219 inches. The diameter d15 of the larger diameter portion can be 0.5 inches.

Figure 6A:
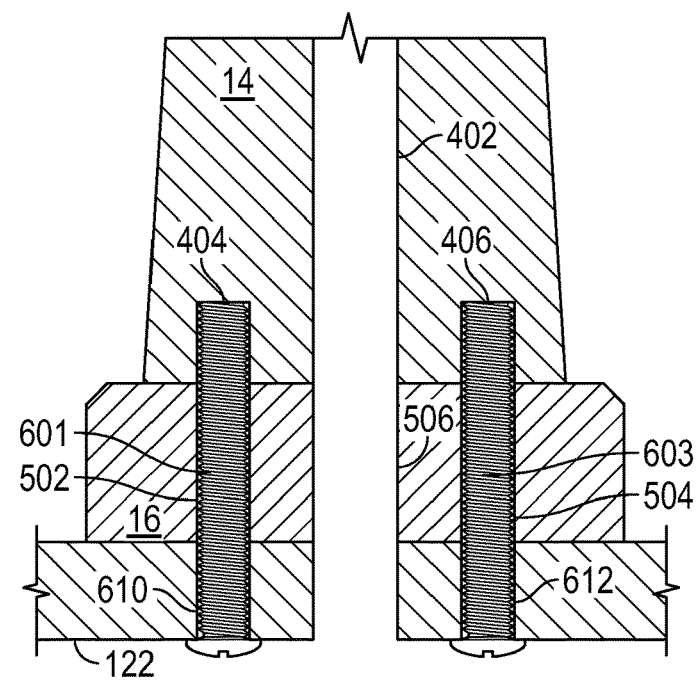
FIG. 6A is a cross-sectional view of the insulating spacer attached to the heating spike and to an upper plate of the housing according to an exemplary embodiment.

Referring to FIG. 6A, an exemplary embodiment in which first attachment members 601, 603 directly connect the insulating spacer 16, heating spike 14 and upper plate 122 of the housing 12 will be discussed. In this embodiment, the first attachment members 601, 603 are two screws which include head portions located in the housing 12, extending portions extending through the receiving holes 610, 612 of the upper plate upper plate 122 and the through-holes 502, 504 of the insulating spacer 16, and an engaging portion engaging with the receiving portions 404, 406 of the heating spike 14. Particularly, the attachment members 601, 603 include engaging portions such as threads which engage with threaded interior portions of the receiving portions 404, 406 of the heating spike 14.

While the food-grade insulating spacer 16 provides excellent resistance to heat transfer from the heating spike 14 to the housing 10, if the first attachment members 601, 603 are standard metal screws directly connecting the heating spike 14, insulating spacer 16 and housing 10, they can provide a heat path between the heating spike 14 and the housing 10. Therefore, first attachment members 601, 603 are preferably screws made from or coated with a heat-resistant metal and oxides, ceramics, porcelain, enamel, PTFE, and/or other plastics similar to PTFE. Such a low heat-conducting material will block the heat path. Further, the first attachment members 601, 603 are not located in the food zone.

Figure 6B:
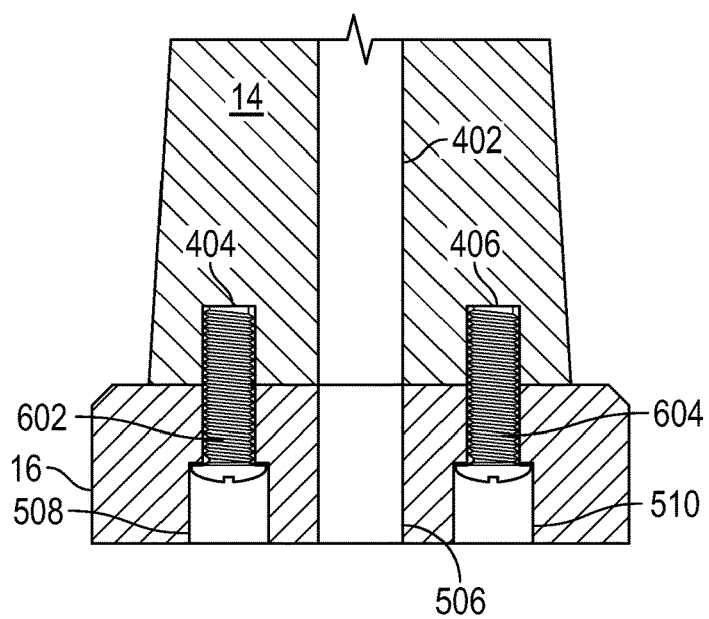
FIGS. 6B-6C are cross-sectional views of the insulating spacer connected to the heating spike and the insulating spacer connected to the upper surface of the housing according to an exemplary embodiment.
Figure 6C:
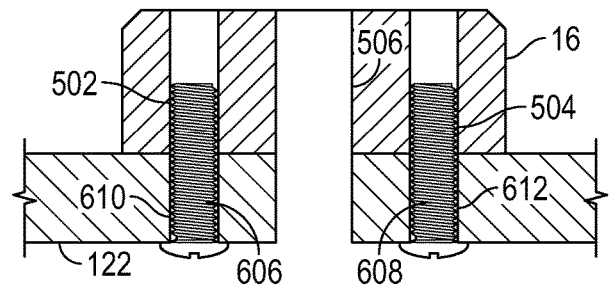

Referring to FIGS. 6B-6C, another exemplary embodiment of first attachment members 602, 604, 606, 608 indirectly connecting the insulating spacer 16, heating spike 14 and upper plate 122 of the housing 12 will be discussed. Generally, the first attachment members 602, 604, 606, 608 connect the insulating spacer 16 to the base portion of the heating spike 14 and to the upper surface on the upper plate 122 of the housing 12 while preferably preventing direct contact between the heating spike 14 and the housing 12. In the discussion of this embodiment, the attachment members 606, 608 will be referred to here as primary attachment members and attachment members 602, 604 will be referred to as secondary attachment members. The use of the terms "primary and secondary" does not in any way relate to the importance of the attachment members, but merely distinguishes the two groups. Generally, the primary attachment members 606, 608 extend upwards, passing through the upper plate 122 of the housing 12 to be received by the receiving portions of the through-holes 502, 504. Particularly, the primary attachment members 606, 608 can include a head portion disposed in the housing 12 and an engaging portion engaging with a receiving portion of the of the through-holes 502, 504 of the insulating spacer 16. The head portion can abut against the interior side of the upper plate 122 of the housing 12. The engaging portion can engage with the interior threads of the through holes 502, 504 of the insulating spacer 16 and receiving holes 610, 612 of the upper plate of the housing 12.

Generally, the secondary attachment members 602, 604 extend upwards, passing through the top of the insulating spacer 16 to be received by the receiving portions of the through-holes 404, 406 of the heating spike 14. Particularly, the secondary attachment members 602, 604 can include a head portion disposed in the insulating spacer 16 and an engaging portion engaging with interior threads of receiving portions 404, 406 of the heat spike 14. The head portion of attachment members 602, 604 can be disposed in the larger diameter portion of the through-holes 508, 510, while the engaging portion passes through the narrower diameter portion of the through-holes 508, 510 and engages with the receiving portions 404, 406 of the heating spike 14.

Because the secondary attachment members 602, 604 are disposed in through-holes 508, 510, while the primary attachment members 606, 608 are disposed in through-holes 502, 504, the primary attachment members 606, 608 can be sufficiently separated from the secondary attachment members 602, 604 to prevent a heat path between the housing 12 and the heat spikes 14. That is, none of the attachment members 602, 604, 606, 608 contact each other or extend all of the way from the heating spike 14 to the housing 10. However, the first attachment members 602, 604, 606, 608 can also be made from or coated with a heat-resistant metal and oxides, ceramics, porcelain, enamel, PTFE, and/or other plastics similar to PTFE to provide further protection against a heat path. Further, the first attachment members 602, 604, 606, 608 are not located in the food zone.

Figure 7:
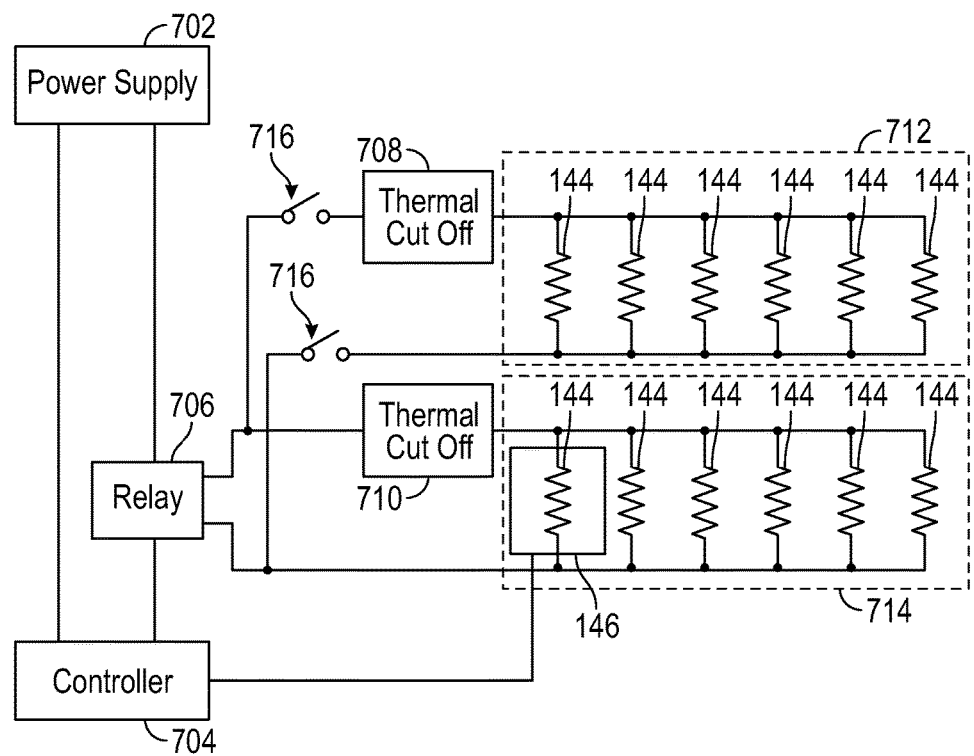
FIG. 7 is block diagram illustrating an electrical circuit of the toasting device.

Referring to FIG. 7, an exemplary electrical circuit configuration of the toasting device 10 will be discussed. A power supply 702 provides electrical power to the controller 704 directly and to the heating elements 144 of the spikes via a relay 706. Grounding can be provided by an internal grounding connection (not shown). The heating elements 144 of each of the first row 712 and second row 714 are connected together in parallel row-wise. The heating elements 144 of the second row 712 can be connected to the relay 706 via switch 716. Switch 716 can be a double pole, single throw (DPST) switch which represents the right switch 206 on the front panel. Another switch (not shown) connected to the power on and off to the controller 704 can represent the left switch 204. One of the spikes in the second row 714 includes the thermocouple 146. The controller 704 can be directly coupled to the thermocouple 146 to measure the temperature of its spike, thereby measuring the temperature of the toasting device 10. The controller 704 is coupled to the heating elements 144 via the relay 706.

First and second thermal cutoff devices 708 and 710 are coupled to the first row 712 and second row 714 of the heating elements 144, respectively. Potential overheating of the heating spikes and other electrical malfunctions present safety issues when using the toasting device, particularly in heavy-duty commercial use. The thermal cutoff devices 708, 710 can stop power supply and thus shut-off the internal heating elements 144 of its respective row when, for example, a temperature associated with the heating spike is greater than a predetermined limit and/or when a malfunction occurs.

During operation, buns (not shown) are placed on the plurality of heating spikes 14 of the toasting device 10 to form a cavity having an opening at only one end in each of the plurality of food items. Particularly, the switches 204, 206 are switched on to permit electrical power to flow to the rows 712, 714 of heating elements 144 from the power supply 702 via relay 706. The controller 704 is manipulated by the user via adjustment interfaces on the digital temperature control panel 202 prior to or after placing the buns on the spikes 10 to adjust the electrical power to the heating elements 144 and thus the heat of the heating spikes 14. The buns are heated to a predetermined temperature to thereby toast an interior surface of the cavities.

The power supply 702 may supply 220 VAC through a strain relieved cord terminated in a 20 AMP 250 VAC plug. The relay 706 may be an OMRON G7L-2A-TUBJ-C3 Relay. The switches 716 can be CA series non-illuminated rocker switches made by C&K Components. The internal heating elements 144 may be 200 Watt cartridge heaters. The thermal cutoff devices 708, 710 can be a normally closed Testco Series 36T21 configured to open and cut off power at approximately 248 degrees Fahrenheit (±9) or 120 degrees Celsius (±5).

The controller 704 can be a digital controller such as, for example, a Fuji micro-controller PXR series digital temperature controller. Generally, the digital controller can be a controller executing computer instructions (software) stored in memory, integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, discussion of such software and ICs will be limited to the essentials with respect to the principles and concepts used by the exemplary embodiments.

Figure 8A:
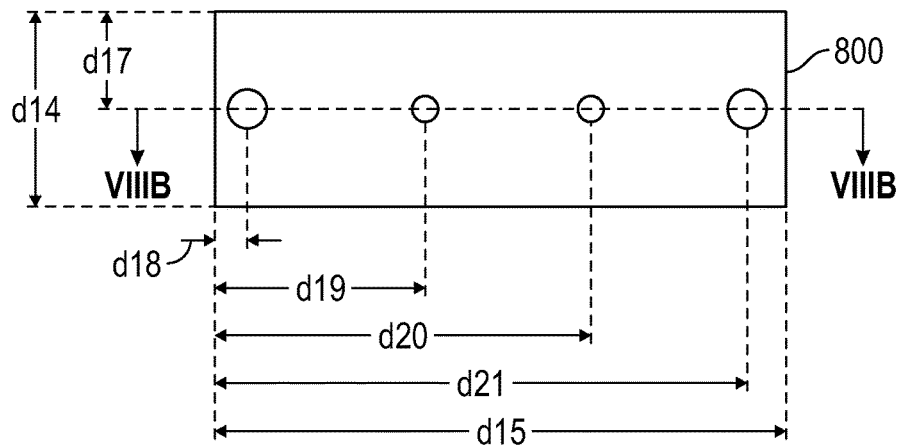
FIG. 8A is a top view of the thermal cutoff mounting bracket of the toasting device according to an exemplary embodiment.
Figure 8B:
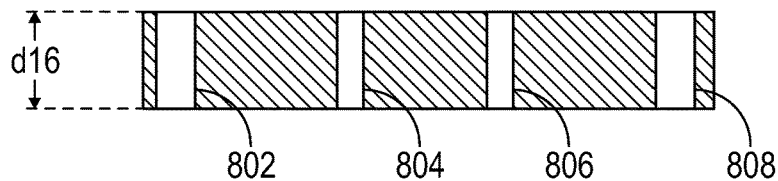
FIG. 8B is a cross-sectional view of the thermal cutoff mounting bracket along line VIIIB of FIG. 8A.

Referring to FIGS. 8A-8B, a mounting bracket 800 for the thermal cutoff devices 708, 710 will be discussed. It is desirable to connect the thermal cutoff devices 708, 710 close to the heat source (heating spikes 14) in order to more effectively monitor the heat levels. However, no external screws, nuts, and other fasteners should be in the food zone. Therefore, in order to connect the thermal cutoff devices 708, 710 close to the heat source, but not in the food zone, each of the thermal cutoff devices 708, 710 is mounted on the respective mounting bracket 800, which is secured to an internal surface portion of the housing 10 under one or more of the heating spikes 14 by second attachment members. Particularly, the mounting bracket 800 is designed to be able to be close to the heat source, yet present no external fastener points within the food zone.

The mounting bracket 800 includes outer through-holes 802, 808 and inner through-holes 804, 806. The inner through-holes 804, 806 can include receiving portions such as interior threads for receiving 6-32 screws. The outer through-holes 802, 808 can be clearance holes. Regarding exemplary dimensions of the bracket 800, the width d14 can be 1 inch, the length d15 can be 3.6 inches, the height d16 can be 0.50 inches, the outer through-holes 802, 808 can have a diameter of 0.219 inches, a distance d17 from the center of the through-holes to the width-wise edges can be 0.50, a distance d18 from the length-wise edges to the center of the nearest outer though-holes 802, 808 can be 0.206 inches, a distance d19 from the length-wise edges to the center of the nearest of the inner though-holes 804, 806 can be 1.331 inches, a distance d20 from the length-wise edge to the center of the farthest of the inner though-holes 804, 806 can be 2.269 inches, and a distance d21 from the length-wise edge to the center of the farthest of the outer though-holes 802, 808 can be 3.394 inches. The bracket 800 can be made from, for example, aluminum.

Figure 9A:
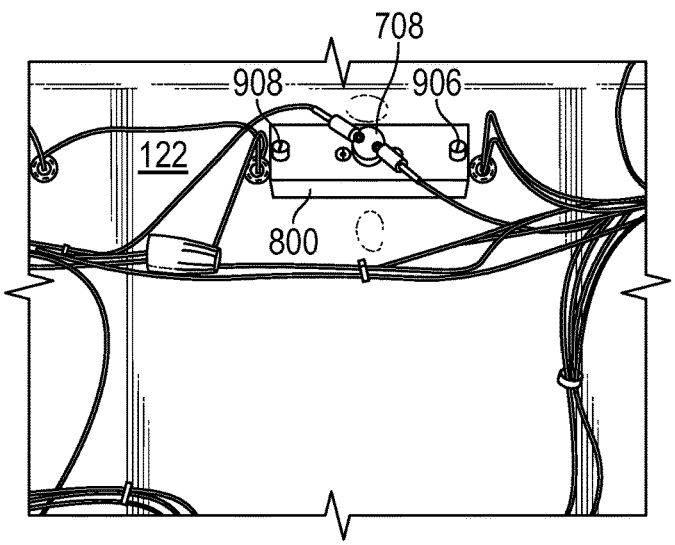
FIG. 9A is a perspective view of the thermal cutoff mounting bracket secured to an internal portion of the toasting device.
Figure 9B:
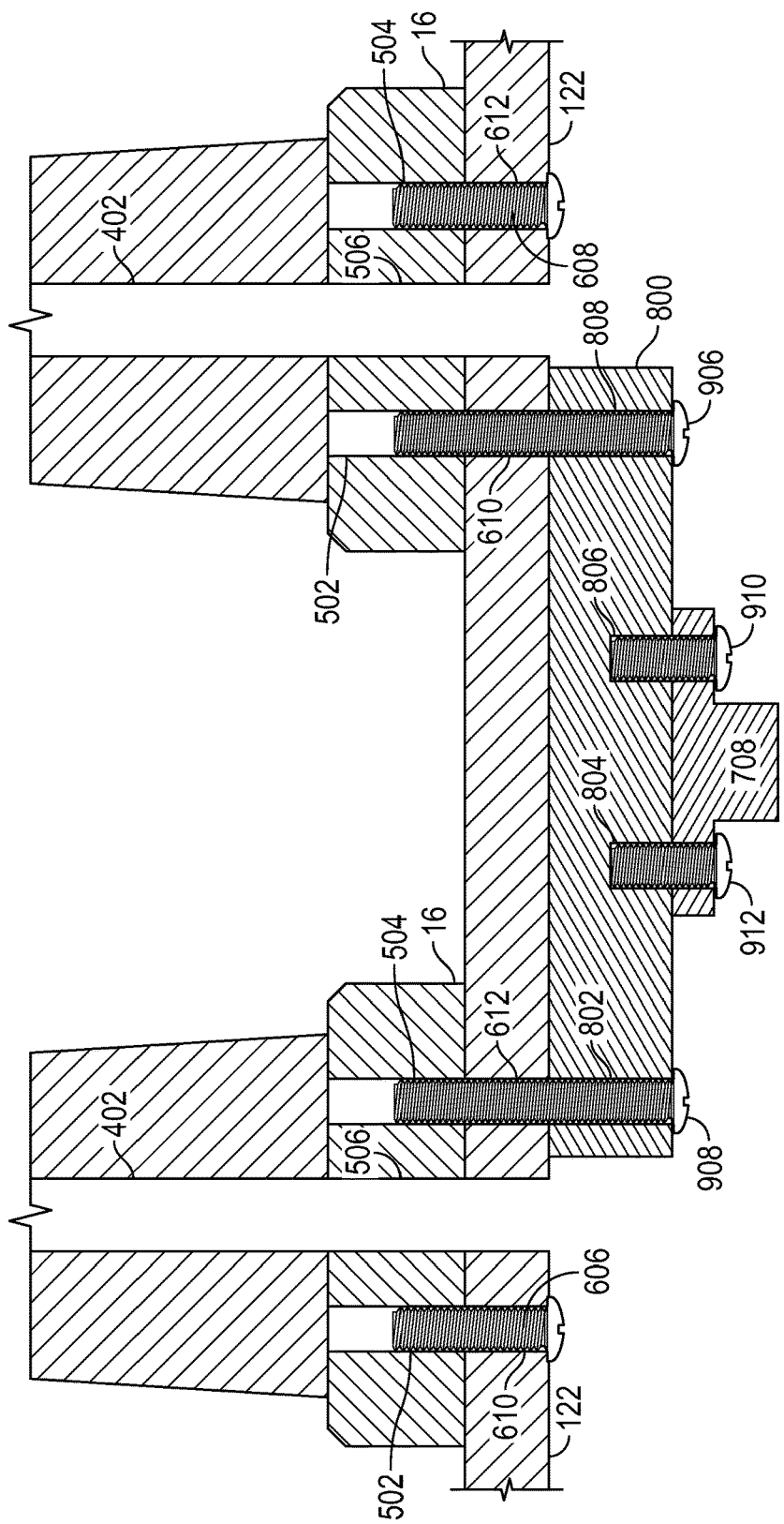
FIGS. 9B-9C are cross-sectional views of the thermal cutoff mounting bracket secured to an internal portion of the toasting device according to exemplary embodiments.

As shown in FIG. 9A, the mounting bracket 800 is secured to an internal surface portion (internal surface of the top plate 122) of the housing 10 under two of the heating spikes 14 by second attachment members 906, 908 disposed in the outer through-holes 802, 808. The thermal cutoff device 708 is mounted on the mounting bracket 800 by third attachment members 910, 912 (FIG. 9B) disposed in the inner through-holes 804, 806. In an exemplary embodiment shown in FIG. 9B, the second attachment members 906, 908 can replace the primary attachment members 608 in one insulating spacer 16 and the primary attachment member 606 in a different insulating spacer 16. Particularly, the second attachment members 906, 908 are long enough to extend through the outer though-holes 802, 808 of the mounting bracket 800, the through-holes 610, 612 of the housing 12 and to the through-holes 502, 504 of the insulating spacer 16. In this embodiment, the receiving portions of the through-holes 502, 504 can engage with engaging portions of the second attachment member 908 and to the second attachment member 906.

Figure 9C:
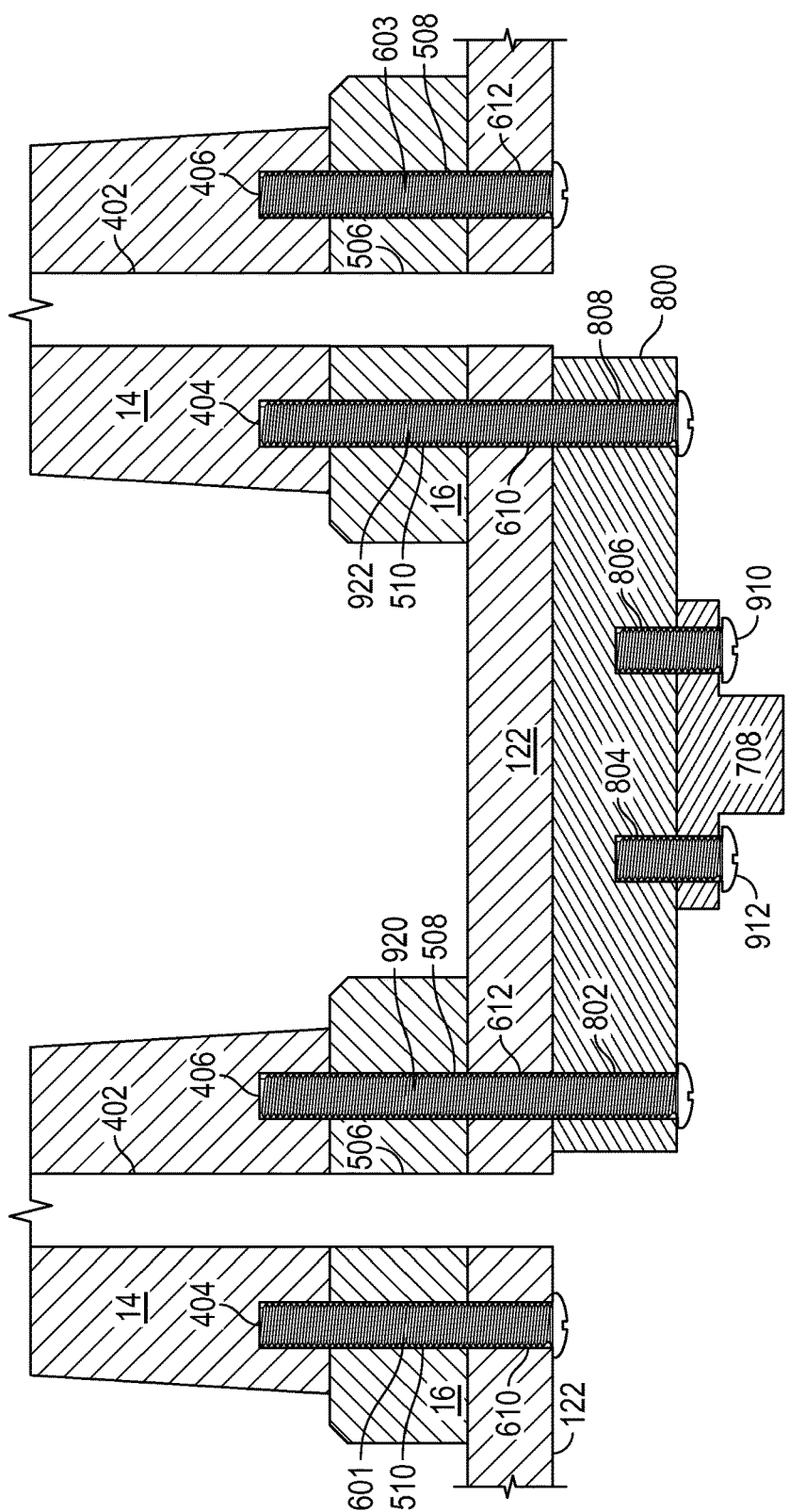

In an exemplary embodiment shown in FIG. 9C, the second attachment members 920, 922 can replace the attachment members 601 in one insulating spacer 16 and the attachment member 603 in a different insulating spacer 16. Particularly, the primary attachment members 920, 922 are long enough to extend through the outer though-holes 802, 808 of the mounting bracket 800, the through-holes 610, 612 of the upper plate 122 of the housing 12, the through-holes 508, 510 of the insulating spacers 16, and to the receiving portions 404, 406 of the heating spikes 14. The receiving portions 404, 406 of the heating spikes 14 can engage with engaging portions of the second attachment member 920, 922.

Figure 10:
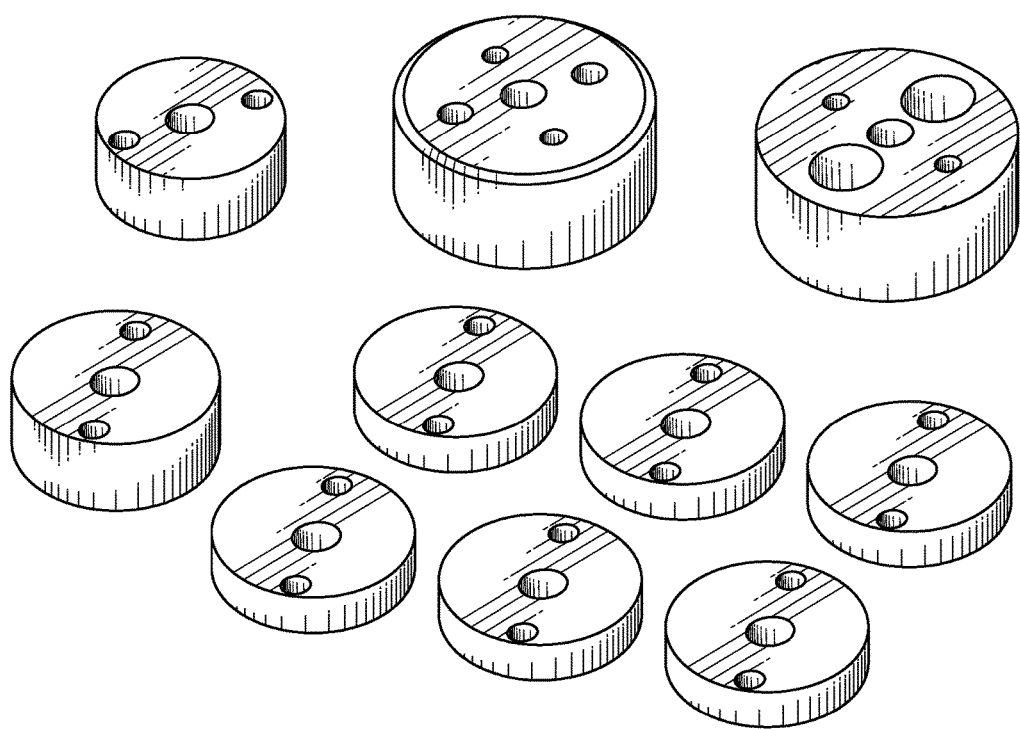
FIG. 10 is a perspective view of exemplary insulating members.

The toasting device 10 is not limited to the above-described embodiments. For example, as shown in FIG. 10, the number and/or size of the through-holes 502, 504, 506, 508, 510 of the insulating spacer 16 may be different. Further, the height (thickness) and diameter of the insulating spacer may be different. Moreover, the manner by which the insulating spacer 16 is connected to the heating spike 14, the housing 10 and/or the mounting bracket 800 may be different. For example, the number of attachment members may be different. Further, more than one insulating spacer 16 can be disposed in a stacked arrangement between the heating spike 14 and the housing 12. It should also be noted that although two thermal cutoff devices 706, 708 were shown in FIG. 7, other numbers and arrangements of the thermal cutoff devices are possible.

Other embodiments will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A toasting device for heating a plurality of food items, the toasting device comprising:
    a housing;
    a plurality of heating spikes, each including a pointed portion extending outwardly from an upper surface of the housing for creating a cavity in a respective one of the plurality of food items, a base portion, and an internal heating element; and
    a plurality of insulating spacers connected to the base portions of the plurality of heating spikes, respectively, each of the plurality of insulating spacers connected to the respective heating spike and an upper surface of the housing by first attachment members and second attachment members to thereby prevent direct contact between the plurality of heating spikes and the housing;
    a thermal cutoff device to shut off the internal heating elements when a temperature associated with the toasting device is greater than a predetermined limit; and
    a mounting bracket on which the thermal cutoff device is mounted, the mounting bracket secured to an internal surface portion of the housing under one or more of the plurality of heating spikes by the second attachment members, wherein the second attachment members include:
a primary attachment member including a head portion abutting the mounting bracket, an extending portion extending through the upper surface of the housing and an engaging portion engaging with a receiving portion of the insulating spacer; and
wherein the first attachment members include:
a secondary attachment member including a head portion disposed in the insulating spacer and an engaging portion engaging with a receiving portion of the heating spike, and
wherein each of the plurality of insulating spacers is composed of a heat resistive material to insulate the housing from heat generated from the respective heating spike,
wherein each of the plurality of insulating spacers includes a plurality of first through holes and second through holes, each of the second through holes comprising:
a larger diameter portion; and
a narrower diameter portion connected to the larger diameter portion to provide an interior connection surface, wherein the head portion of the secondary attachment member abuts the larger diameter portion at the interior connection surface;
each of the first through holes comprising the receiving portion of the insulating spacer to engage with the primary attachment member.

2. The toasting device of claim 1, wherein the internal heating element is disposed within an upper half of the respective heating spike to provide an unheated lower portion of the respective heating spike.

3. The toasting device of claim 1, wherein the material of each of the insulating spacers is polytetrafluoroethylene (PTFE).

4. The toasting device of claim 1, further comprising:
a controller electrically coupled to the plurality of heating spikes to control electrical power to the plurality of heating spikes to thereby control temperature,
wherein at least one of the plurality of heating spikes includes a thermocouple disposed within an internal chamber of the at least one heating spike for measuring temperature, the thermocouple electrically coupled to the controller.

5. The toasting device of claim 1, wherein
the first attachment members include a material having heat conductivity to limit heat transfer from the plurality of heating spikes to the housing.

6. A method of heating the plurality of food items, comprising:
placing the plurality of food items on the plurality of heating spikes of the toasting device of claim 1 to form the cavity in each of the plurality of food items, the cavity having an opening at only one end; and
heating the plurality of food items to a predetermined temperature to thereby toast an interior surface of the cavity of each of the plurality of food items.

7. A toasting device for heating a plurality of food items, the toasting device comprising:
a housing;
a plurality of heating spikes, each including a pointed portion extending outwardly from an upper surface of the housing for creating a cavity in a respective one of the plurality of food items, a base portion, and an internal heating element; and
a plurality of insulating spacers connected to the base portions of the plurality of heating spikes, respectively, each of the plurality of insulating spacers connected to the respective heating spike and an upper surface of the housing by first attachment members to thereby prevent direct contact between the plurality of heating spikes and the housing,
wherein the first attachment members include:
a primary attachment member including a head portion abutting the housing, an extending portion extending through the upper surface of the housing, and an engaging portion engaging with a receiving portion of the respective insulating spacer; and
a secondary attachment member including a head portion disposed in a through hole in the respective insulating spacer and an engaging portion engaging with a receiving portion of the respective heating spike,
wherein the primary attachment member and secondary attachment members are separated from each other to prevent a heat path between the housing and the respective heating spike,
wherein each of the plurality of insulating spacers includes a plurality of first through holes and second through holes, each of the second through holes comprising:
a larger diameter portion; and
a narrower diameter portion connected to the larger diameter portion to provide an interior connection surface, wherein the head portion of the secondary attachment member abuts the larger diameter portion at the interior connection surface;
each of the first through holes comprising the receiving portion of the respective insulating spacer to engage with the primary attachment member.

8. The toasting device of claim 7, wherein at least one of the plurality of heating spikes includes a thermocouple disposed within an internal chamber of the at least one heating spike for measuring temperature, the thermocouple electrically coupled to a controller.

* * * * *